United States Patent Office 2,836,634
Patented May 27, 1958

2,836,634

P-T-BUTYLALKYLBENZENE PROCESS

Robert J. Lee, La Marque, Joe T. Kelly, Galveston, and Harmon M. Knight, La Marque, Tex., assignors to The American Oil Company, Texas City, Tex., a corporation of Texas No Drawing. Application October 14, 1955
Serial No. 540,612

10 Claims. (Cl. 260—671)

This invention relates to the preparation of t-butyl-alkylbenzenes containing substantially only the para isomer.

In our co-pending application entitled "Depolyalkylation Process," Serial No. 540,611, filed October 14, 1955, there is described and claimed a process for the preparation of t-butylated aromatic hydrocarbon by the reaction of a defined polyisobutylene and a defined aromatic hydrocarbon in the presence of a $BF_3$-hydrate type catalyst. This reaction is extremely effective for the production of mono-t-butyl aromatic hydrocarbons in very high yields. When mono-t-butylalkylbenzenes are prepared using this reaction and freshly prepared catalyst, even with careful control of the reaction conditions relatively large amounts of the meta isomer are produced.

When catalyst which has been reused several times is utilized in this reaction it is possible, by control of operating conditions, to produce a t-butylalkylbenzene product fraction containing in excess of 90 mole percent of the para isomer. It is self-evident that in a commercial operation wherein a constant product quality is desired that makeup catalyst particularly must be of such a nature that product quality will not be impaired or, conversely, no change in operating conditions will be necessary.

An object of the invention is a depolyalkylation process utilizing $BF_3$-hydrate type catalyst wherein t-butylalkylbenzene product is produced which consists substantially of the para isomer. A particular object is a depolyalkylation process utilizing a modified fresh $BF_3$-hydrate catalyst to produce a t-butylalkylbenzene product fraction containing at least about 90 mole percent of the para isomer. A further object is a depolyalkylation process wherein toluene and diisobutylene are reacted to produce t-butyltoluene constaining at least about 90 mole percent of para-t-butyltoluene wherein a $BF_3$-hydrate type catalyst is utilized. Other objects will become apparent in the course of the detailed description.

The process herein utilizes a modified $BF_3$-hydrate type catalyst having a $BF_3$ content between about 66 and 74 weight percent. Usually the catalyst is prepared by adding a modifier to a $BF_3$ monohydrate, i. e., a $BF_3$ water complex containing equimolar amounts of these two constituents. The modifier may be any one of the oxygenated materials from the class consisting of alkanols, alkenols, alkandiols, alkendiols, alkanones and alkenones; these particular oxygenated compounds do not contain more than 7 carbon atoms. Examples of these compounds are methanol, ethanol, hexanol, ethylene glycol, propylene glycol, diethylene glycol, dimethyl ether, diisopropyl ether and acetone. In addition to the above oxygenated compounds, the modifier may be a polyolefin, a cyclopolyolefin, a poly-nuclear polyolefin or a terpene. In general, the diolefins have between 5 and 18 carbon atoms, for example, hexadiene and hexadecanediene. A suitable triolefin is alloocimene. The red oils obtained by the decomposition of Friedel-Crafts halide-hydrocarbon complexes are particularly suitable polynuclear polyolefins. Cyclopentadiene and dicyclopentadiene are illustrative of cyclic polyolefins. Alpha pinene is illustrative of a suitable terpene. The modifier is preferably added to the $BF_3$ hydrate in an amount sufficient to have the $BF_3$ content of the total modified catalyst between about 66 and 74 weight percent. More preferably the $BF_3$ content is between 69 and 72 weight percent.

The aromatic hydrocarbon charged to the process is a monoalkylbenzene containing from 1 to 4 carbon atoms. Examples of suitable monoalkylbenzenes are toluene, ethylbenzene, isopropylbenzene, and t-butylbenzene. It is preferred to operate with toluene and ethylbenzene.

The olefin charged to the process is a polyisobutylene containing from 2 to 4 iso-$C_4$ group, which group is defined herein as one which will produce a t-butyl substituent, or which may be considered as the equivalent of an isobutylene molecule for alkylation purposes. Thus diisobutylene contains two iso-$C_4$ groups and tetraisobutylene contains four iso-$C_4$ groups. It is preferred to use diisobutylene.

In order to produce an alkylate which contains principally the mono-t-butylated alkylbenzene, the mole ratio of benzene hydrocarbon charged and the polyisobutylene is adjusted so that at least about 1 mole of benzene hydrocarbon is present for each iso-$C_4$ group present. Thus, when toluene and diisobutylene are used, at least two moles of toluene are present for each mole of diisobutylene; and when utilizing triisobutylene with toluene, at least 3 moles of toluene are present. The presence of more benzene hydrocarbon is helpful in maximizing the yield of the mono-t-butylated benzene hydrocarbon. As much as 3 moles of benzene hydrocarbon or even more may be present per mole of iso-$C_4$ groups in the reaction zone. In general, when utilizing toluene and diisobutylene, the mole ratio of toluene to diisobutylene is between 2 and 5 and preferably is about 3.

Some depolyalkylation will occur with even very small amounts of catalyst in the reaction zone. In order to increase the reaction rate, large amounts of catalyst are used. In general, the volume ratio of total hydrocarbon charged, i. e., alkylbenzene plus polyisobutylene, to catalyst charged to the reaction zone is from about 3 to 15, and more usually between about 5 and 9.

In order to attain the desired object of a t-butylalkyl-benzene product fraction containing on the order of 80 mole percent or more of the para isomer, the reaction temperature is maintained between about 20° and 50° C. The contacting time has a bearing on the amount of meta isomer present in the product fraction. In general, the time is controlled at these temperatures for between about 5 minutes and 2 hours; in general, when utilizing the higher temperatures, it is desired to use shorter times.

The results obtainable with the process are illustrated by working examples and also, for purposes of comparison, examples utilizing other catalysts. In all of these runs, nitration grade toluene was used and technical grade diisobutylene. The mole ratio of toluene to diisobutylene was 2. The volume of total hydrocarbon charged to catalyst charged was 7.

Fresh $BF_3$-hydrate catalyst was prepared utilizing commercial grade anhydrous boron trifluoride and distilled water. A measured amount of water was placed in a 4 liter flask equipped with a Dry Ice-cooled condenser and a gas dispersion tube. The flask itself was placed in an ice bath. $BF_3$ was bubbled into the water until no more was absorbed; the $BF_3$ addition rate was controlled to keep the water temperature at about 35° C. or below. The solution as analyzed, by conventional procedures, had a $BF_3$ weight percent content of 78.7 which corresponds to about the $BF_3$ monohydrate.

The modified $BF_3$-hydrate type catalyst was prepared by adding the modifier to fresh $BF_3$-hydrate catalyst. In Run 4, acetone was added as the modifier and in Run 5, 2,4-dimethylhexadiene-1,3 was a modifier. For purposes of comparison, the fresh $BF_3$-hydrate catalyst was diluted with ordinary water in Run 3. In Runs 3, 4 and 5, the modified catalyst had a $BF_3$ content of 67.5 weight percent.

For purposes of comparison, Run 2 was made utilizing a $BF_3$-hydrate catalyst which had been previously used 10 times for depolyalkylation of toluene with diisobutylene. Although the used catalyst was not analyzed for $BF_3$ content it contained a considerable amount of hydrocarbonaceous material picked up during the 11 previous usages.

The typical procedure for carrying out the depolyalkylation reaction is described:

Seven moles (644 gms.) of toluene and 190 ml. of $BF_3 \cdot H_2O$ were charged to the reactor. Three and one-half moles of diisobutylene (403 gms.) were charged to the dropping funnel. The stirrer was started and water was circulated through the condenser atop the reactor. The diisobutylene was then added dropwise (approx. 25 ml./min.) to the reacting system. The temperature rose from 23 to 36° C. in about two minutes. At this point ice water was circulated through the reactor coils until the temperature dropped to 33° C., then the circulation was stopped. A reaction temperature of 33 to 36° C. was maintained by this method. At the end of 23 minutes all the olefin had been added, after which the stirring was continued for approximately one minute. After the stirrer was stopped, the reaction mixture separated into two layers. The hydrocarbon layer was drawn off into a separatory funnel with a small amount of hydrocarbon being left on the catalyst layer to prevent $BF_3$ loss to the atmosphere. The hydrocarbon layer was washed with 200 ml. distilled water, then with 200 ml. 10% KOH and finally washed again with 200 ml. of distilled water. The product was then dried overnight with 150 gms. of calcium chloride.

The product was distilled on a 70-plate hypercal column using a 10:1 reflux ratio. The cuts from hypercal with infrared spectrometer analyses are shown below.

| Cut No. | Boiling Range (°F.) | Weight (grams) | Wt. Percent of Total Charged to Dist. | Infra-Red Analysis (Wt. Percent) |
|---|---|---|---|---|
| 1 | IBP-200 | 4.8 | 0.5 | |
| 2 | 200-240 | 76.7 | 8.6 | 82.8% toluene. |
| 3 | 240-365 | 4.8 | 0.5 | |
| 4 | 365-400 | 665.1 | 74.2 | 28% m-t-butyltoluene. 72% p-t-butyltoluene. |
| 5 | 400°+ | 135.2 | 16.2 | 43% 3,5-di-t-butyltoluene. |

The t-butyltoluene produced was blended into a high octane number refinery gasoline base to produce a blend containing 25 volume percent of the t-butyltoluene. The octane number of the blend was determined by the F–1 method (CFR-Research) and the blending octane number of the t-butyltoluene determined. In a base having an F–1 number of 94.6, the t-butyltoluene had a blending octane number of 114. This compares with an octane number, under these circumstances, of 111 for toluene and 109 for a mixture of $C_9$ aromatic hydrocarbons derived from catalytic reformate. These octane data show that t-butyltoluene is an excellent high octane component of gasoline; an additional very desirable feature is the fact that it is sufficiently high boiling to improve the octane number of the tail end of the gasoline which is frequently deficient in high octane components.

The very high purity para-t-butyltoluene obtainable by the process of the invention is an excellent raw material for the manufacture of para-t-butylbenzoic acid, which material is in considerable demand at this time as a chemical intermediate.

The results of these runs are set out in the table. Run No. 1, utilizing fresh $BF_3$-hydrate catalyst, produced a t-butyltoluene product fraction in which the para isomer just barely predominates. In Run No. 2, the 11th use of the used catalyst produced a t-butyltoluene product fraction containing 90% of the para isomer. It is of interest that with the used catalyst a large percentage of toluene reacted and a very small amount of the di-t-butyltoluene was produced as compared with Run No. 1.

In Run 3, using the water-diluted catalyst, only 20% of the toluene charged reacted. However, 95% of the t-butyltoluene product was the para isomer.

*Table I*

| Run Number | 1 | 2 | 3 | 4 | 5 |
|---|---|---|---|---|---|
| Reaction Temperature (°C.) | 33–39 | 33–36 | 30–37 | 32–35 | 31–36. |
| Reaction Time (Minutes) | 61 | 27 | 63 | 58 | 65. |
| Catalyst: | | | | | |
| Modifier | None | | $H_2O$ | Acetone | 2,4-di-methyl Hexadiene-1,3. |
| Wt. Percent $BF_3$ | (¹) | (²) | 67.5 | 67.5 | 67.5. |
| Yields (Mol Percent on Toluene Reacting): | | | | | |
| t-Butyltoluene | 74.1 | 87.8 | 73.1 | 85.0 | 89.3. |
| 3-5-di-t-Butyltoluene | 3.0 | 0.25 | 0.0 | 0.0 | 0.3. |
| Toluene Reacting | 82.5 | 90.5 | 20.0 | 66.1 | 90.6. |
| Isomer Distribution (Wt. Percent): | | | | | |
| para-t-Butyltoluene | 58 | 90 | 95 | 94 | 92. |
| meta-t-Butyltoluene | 42 | 10 | 5 | 6 | 8. |

¹ Fresh catalyst (78.7% $BF_3$).
² Original catalyst analyzed 74.5 wt. percent $BF_3$, this was 11th run reusing same batch catalyst. A considerable dilution by acid soluble oil had occurred by this time, but no additional modifier was added.

In Run 4, using the acetone-modified $BF_3$ hydrate, 66% of the toluene charged reacted to produce a t-butyltoluene product containing 94% of the para isomer. In Run No. 5, the hexadiene-modified $BF_3$ hydrate material gave a yield of 90% based on toluene charged; the t-butyltoluene product contained 92 mole percent of the para isomer.

The data show that the fresh $BF_3$-hydrate catalyst may be modified by the addition of materials such as hexadiene to obtain a result which is at least as good as that obtainable utilizing a catalyst which has been used until a sufficient amount of natural modification has taken place. By means of the modified catalyst set out herein, it is possible to operate a depolyalkylation process wherein the desired very high purity para-t-butylalkylbenzene is obtainable immediately without the need for a period of catalyst conditioning, during which the para-t-butylalkylbenzene content of the t-butylalkylbenzene product fraction varies continuously finally reaching the about 90% point.

Thus, having described the invention, what is claimed is:

1. A process which comprises depolyalkylating a monoalkylbenzene, where the alkyl group contains from 1 to 4 carbon atoms, with a polyisobutylene having from 2 to 4 "iso-C$_4$" groups at a temperature between about 20° C. and 50° C. for a time between about 5 minutes and 2 hours, in the presence of a liquid modified BF$_3$-hydrate catalyst, the volume ratio of total hydrocarbon charge to liquid catalyst being between about 3 and 15, and separating catalyst from a reaction product mixture containing a t-butylalkylbenzene product consisting substantially of the para isomer, wherein said catalyst consists essentially of BF$_3$-monohydrate and a modifier selected from the class consisting of alkanols, alkenols, alkandiols, alkendiols, alkanones and alkenones having not more than 7 carbon atoms, respectively, polyolefins, and, cyclic polyolefins, said modified catalyst having a BF$_3$ content between about 66 and 74 weight percent.

2. The process of claim 1 wherein said alkylbenzene is toluene.

3. The process of claim 1 wherein said alkylbenzene is ethylbenzene.

4. The process of claim 1 wherein said polyisobutylene is diisobutylene.

5. The process of claim 1 wherein said modifier is ethanol.

6. The process of claim 1 wherein said modifier is octadiene.

7. The process of claim 1 wherein said modifier is alloocimene.

8. The process of claim 1 wherein said modifier is acetone.

9. The process of claim 1 wherein said modifier is diisopropyl ether.

10. A process for the preparation of p-t-butyltoluene, which process comprises depolyalkylating toluene with diisobutylene, in a mole ratio of toluene to diisobutylene of between 2 and 5, at a temperature between about 20° C. and 50° C. for a time between 5 minutes and 2 hours, in the presence of a modified BF$_3$-hydrate type catalyst, the volume ratio of total hydrocarbon charged to catalyst being between about 5 and 9, and separating catalyst from a reaction product mixture having a t-butyltoluene fraction containing at least about 90 mole percent of the para isomer, wherein said catalyst consists of BF$_3$-monohydrate and octadiene, said catalyst having a BF$_3$ content between about 69 and 72 weight percent.

References Cited in the file of this patent

UNITED STATES PATENTS

| | | |
|---|---|---|
| 2,275,312 | Tinker et al. | Mar. 3, 1942 |
| 2,376,119 | Bruner et al. | May 15, 1945 |
| 2,429,691 | Johnson et al. | Oct. 28, 1947 |

OTHER REFERENCES

Booth et al., "Boron Trifluoride and Its Derivatives," pages 305, 306, 208 and 201. Pub. 1949 by John Wiley & Sons, Inc., New York City.